Figure 1:
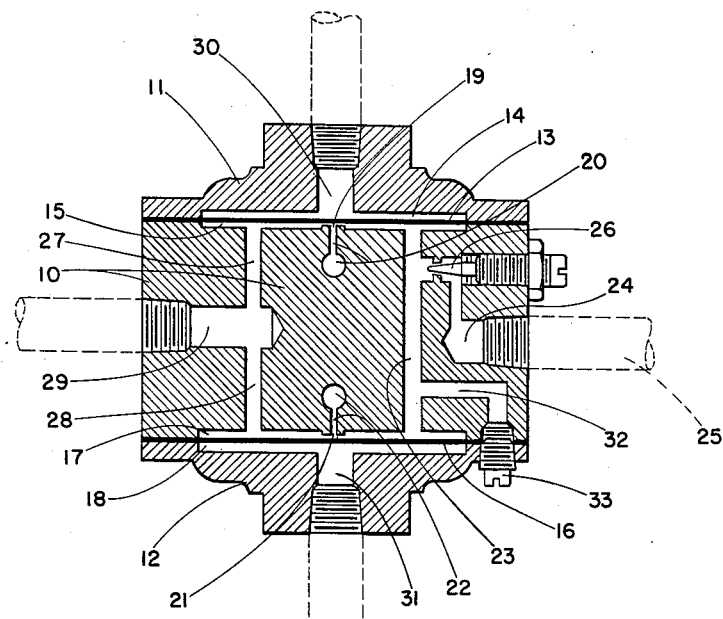

Jan. 22, 1957  H. R. JAQUITH  2,778,372
PNEUMATIC PRESSURE RESPONSIVE DEVICES
Filed Feb. 18, 1953

*INVENTOR.*
HOWARD R. JAQUITH
BY D. Clyde Jones
ATTORNEY

United States Patent Office 2,778,372
Patented Jan. 22, 1957

2,778,372
PNEUMATIC PRESSURE RESPONSIVE DEVICES

Howard R. Jaquith, Rochester, N. Y., assignor to Taylor Instrument Companies, Rochester, N. Y., a corporation of New York Application February 18, 1953, Serial No. 337,566

9 Claims. (Cl. 137—111)

This invention relates to pressure responsive mechanisms or relays adapted for employment in pneumatic control systems. More particularly, it relates to a low pressure selector relay for transmitting the lower of two pressures.

The employment of such a selector in pneumatic control circuits would result in a material improvement in control efficiency over that which is presently attainable in many control circuits employed at the present time. As just one example, it is desirable to control the speed of a prime mover such as a gas turbine at a predetermined desirable value. However, in the event that either the inlet temperature or the exit temperature to and from the turbine exceeds or falls below a certain value, the turbine may be seriously damaged if it is allowed to be operated at the predetermined desirable speed and it is therefore customary to incorporate in the control system secondary instruments or devices responsive to the inlet and exit temperatures of the turbine which will effect a modification of the primary speed control under adverse temperature conditions. The secondary device may include a proportional controller, for example, which is responsive to the variable pressure outputs from two independent devices responsive respectively to the inlet and exit temperature from the turbine while the output from the proportional controller is fed to a primary or master controller which is also directly responsive to the speed of the turbine as well as to the output from the proportional controller. Thus the output pressure from the master controller which regulates the fuel control valve in the fuel feed line to the turbine is always a function of three variables indiscriminately.

Under normal temperature conditions, however, it would be more desirable and lead to improved efficiency of control if the regulation of the fuel control valve was determined or controlled entirely by the primary or master controller while on the other hand, it would be equally desirable under abnormal temperature conditions if this regulation was determined wholly by one or both of the secondary controls. This desirable result could be realized by providing in the input lines to the proportional controller from the two independent temperature responsive devices a selector which would transmit an output pressure to the proportional controller independent of the turbine inlet or exit temperatures provided these temperatures were within the normal and safe range but would transmit an output pressure proportional to temperature when these temperatures were abnormal. More specifically, if the output pressure from the device responsive to the turbine exit temperature decreased, for example, with increased exit temperature the selector would not transmit or would blank off transmission of pressure from the exit temperature responsive device when this pressure remained above a predetermined minimum value but would transmit a fixed pressure to the controller independent of the turbine exit temperature and approximately equal to the predetermined minimum value. On the other hand, the output pressure from the temperature responsive device would be transmitted by the selector when its value dropped below the value of the fixed pressure independent of the turbine exit temperature. In other words, the device would select and transmit the lower of two pressures fed thereto.

It is therefore an object of this invention to provide a relatively simple and inexpensive device adapted to transmit the lower of two pressures in a pneumatic control system.

As a modification of the invention, it is also an object to provide a single and likewise simple device adapted to transmit the higher of two pressures.

Figure 2:
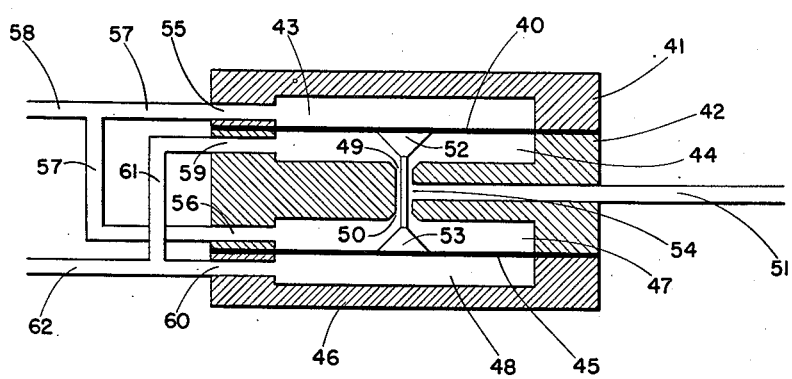

For a complete understanding of my invention, references should be had to the following specification and the accompanying drawings in which Fig. 1 is a cross sectional view of the low pressure selector or device of the invention, and Fig. 2 is a cross sectional view of a modification of the invention illustrating a device adapted to transmit the higher of two pressures in a pneumatic control system.

Referring to the drawings in detail, I have illustrated in Figure 1 a low pressure selector or discriminator comprising a main body portion 10 and end portions 11 and 12 encasing or enclosing a pair of compartments. A movable member or wall, such as a flexible diaphragm 13 sealingly clamped between peripheral portions of housing sections 10 and 11 divides one of the compartments into two chambers 14 and 15 while a similar flexible diaphragm 16 sealingly clamped between sections 10 and 12 divide the other compartment into two chambers 17 and 18. Chamber 15 is provided with a discharge port or opening 19 in communication through a discharge or vent passage 20 with the atmosphere, a vacuum or other pressure while chamber 17 is likewise provided with a discharge port 21 also in communication through a vent passage 22 with the atmosphere, a vacuum or some other pressure level. It will, of course, be understood that passages 20 and 22 may be interconnected. Discharge ports 19 and 21 are both sealable and the sealing thereof is a function of or is controlled by the respective positions of diaphragms 13 and 16 with respect thereto. More specifically, flexible diaphragm 13 is engageable with and adapted to seal off port 19 while flexible diaphragm 16 is engageable with and adapted to seal off discharge port 21. Chambers 15 and 17 are connected by means of an interconnecting passageway 23 with an input passage 24 which in turn may be connected to a metered or measured supply source of fluid pressure, such as fluid fed through an orifice or restriction elsewhere in the system outside the selector. On the other hand, and as illustrated, an unmetered supply may be connected directly to the device through conduit 25 and the metering or measuring effected by means of either a fixed restriction or the adjustable restriction 26 in the input passage leading to chambers 15 and 17. Chambers 15 and 17 are also each provided with another opening respectively in communication through passageways 27 and 28 with an output passage 29. End sections 11 and 12 are provided with openings 30 and 31 respectively, for conduit connection of the selector to a source or sources of fluid pressure.

However, when employed as a low pressure selector, one of the openings such as 30, for example, in communication with chamber 14 is connected to a source of fluid pressure of a given value while opening 31 in communication with chamber 18 is connected to a source of fluid pressure greater or less in value than that to which chamber 14 is subjected. Assuming, for example, that the pressure in chamber 14 is greater than the pressure in chamber 18 and assuming further that the metered supply fed through passage 23 to chambers 15 and 17 is lower in pressure value than the high pressure on the opposite side of diaphragm 13 in chamber 14 and higher than the low pressure on the opposite side of diaphragm 16 in chamber 18. Then diaphragm 13 will be flexed into engagement with and seal off the discharge port 19 in chamber 15 while diaphragm 16 will throttle the exhaust or discharge through the opening 21 in chamber 17 so that the supply will be transferred to output passage 29 at a pressure value equal to the low pressure in chamber 18. In lieu of the opening in chamber 15 to output passage 27 and the opening in chamber 17 to output passage 28, these may be eliminated as well as output passage 29 and an output passage 32, in communication with interconnecting passage 23, may be provided. Then with plug 33 removed from passage 32 the supply likewise will be transferred therethrough at a pressure value equal to the low pressure in chamber 18. Thus, a relatively simple pneumatic device which will automatically select and transmit the lower of two fluid pressures has been provided.

In the modification shown by Figure 2, I have diagrammatically illustrated a device wherein there has been employed the basic idea of a pair of compartments respectively divided into a pair of chambers by movable members and with one of the chambers in each compartment having a sealable discharge port the sealing of which is controlled by the position of one of the movable members with respect thereto. However, this device is a selector adapted to select and transmit the higher of two pressures. Briefly, the device comprises a movable member such as flexible diaphragm 40 with the peripheral portion thereof clamped between housing or casing sections 41 and 42 which define and enclose a space or compartment divided into a pair of chambers 43 and 44 by the movable member 40. Another movable member 45 is similarly clamped between casing section 42 and a third casing section 46 and divides a space defined by these casing sections into a pair of chambers 47 and 48. Chambers 44 and 47 are provided with discharge ports 49 and 50 respectively, in communication with an output passage 51 through housing section 42. The entrances into discharge ports 49 and 50 are each provided with a valve seating surface for engagement of valves 52 and 53 respectively therewith. Valves 52 and 53 are interconnected by a rigid member 54 extending through the passage interconnecting chambers 44 and 47 and with output passage 51. Otherwise, these valves are respectively engaged by and interposed between flexible diaphragms 40 and 45.

The spaces within chambers 43 and 47 are interconnected by another opening in each chamber, passages 55, 56 and interconnecting conduit 57 in turn connected to a conduit 58 in communication with a source of fluid pressure while the spaces within chambers 44 and 48 are likewise interconnected by another opening in each chamber, passages 59, 60 and interconnecting conduit 61 also connected to a conduit 62 in communication with a source of fluid pressure. Although conduits 57 and 61 have been illustrated, in the interest of simplicity as fluid conductors or conveyors positioned outside the device proper, it will be appreciated that passage 55 may be directly connected with passage 56 and passage 59 with passage 60 by passages positioned wholly within the device in lieu of the outside interconnecting conduits 57 and 61.

In operation and assuming that chamber 43 and chamber 47 are connected by way of conduit 58 to a source of fluid pressure of a given value and that chamber 48 and chamber 44 are connected by way of conduit 62 to another source of fluid pressure of higher magnitude than the source connected to chambers 43 and 47, then diaphragms 40 and 45 will be flexed so as to move valve 53 into sealing engagement with the valve seat of discharge port 50 thereby preventing passage of the lower pressure fluid but allowing transmission of the higher pressure fluid through conduit 61, passage 59, chamber 44, discharge port 49 and so to output passage 51.

While I have, in accordance with the patent statutes, shown and described particular embodiments of my invention and a modification thereof, it will be obvious that changes and modifications can be made without departing from the invention in its broader aspect and I, therefore, aim in the appended claims to cover all such changes and modifications as fall within the true spirit and scope of the invention.

What I claim as new and desire to secure by Letters Patent of the United States is:

1. In a fluid pressure responsive device adapted to transmit fluid from one of two sources of fluid pressure, a pair of spaced compartments within said device and a pair of movable members respectively dividing each of said compartments into a pair of chambers, one of said chambers in each of said compartments having a sealable discharge opening therein, the sealing of said discharge openings being respectively controlled by the position of said movable members with respect thereto, said ones of said chambers having said discharge openings therein interconnected by a passage extending therebetween.

2. A fluid selector comprising a casing having a pair of compartments therein, movable walls respectively dividing each of said compartments into a pair of chambers, a first one of said chambers in each of said compartments having a sealable discharge opening therein, the sealing of said discharge openings being respectively controlled by the position of said movable walls with respect thereto, each of the second of said chambers of said compartments having an opening therein for communication of said second chambers respectively with sources of fluid pressure, said first chambers being interconnected by a passageway therebetween.

3. A fluid selector comprising a casing having a pair of compartments therein, movable walls respectively dividing each of said compartments into a pair of chambers, a first one of said chambers in each of said compartments having a sealable discharge opening therein, the sealing of said discharge openings being respectively controlled by the position of said movable walls with respect thereto, each of the second of said chambers of said compartments having an opening therein for simultaneous communication of said second chambers respectively with separate sources of fluid pressure, said first chamber in each of said compartments being in communication with a source of fluid pressure other than the source of fluid pressure in communication with said second chamber on the opposite side of the movable wall of said compartment.

4. A fluid selector comprising a casing having a pair of chambers therein, each of said chambers having a discharge opening therein, a movable wall for each of said chambers engageable with and adapted to seal the discharge opening in said chamber, a source of fluid pressure in communication with said chambers and exerting forces tending to move said movable walls respectively away from said discharge openings and means other than said source of fluid pressure exerting forces in a direction opposite to said first mentioned forces tending to move said movable walls respectively into engagement with said discharge openings.

5. A fluid selector comprising a casing having a pair of compartments therein, movable walls respectively dividing each of said compartments into two chambers, a first one of said chambers in each of said compartments having a discharge opening therein, said movable walls being respectively engageable with and adapted to seal said discharge openings, a metered source of fluid pressure in communication with said first chambers and exerting forces tending to move said movable walls respectively away from said discharge openings and means other than said source of fluid pressure in the second of said chambers of said compartments exerting forces in a direction opposite to said first mentioned forces tending to move said movable walls respectively into engagement with said discharge openings.

6. A fluid selector comprising a casing having a pair of compartments therein, movable walls respectively dividing each of said compartments into two chambers, a first one of said chambers in each of said compartments having a discharge opening therein, said movable walls being respectively engageable with and adapted to seal said discharge openings, each of the second of said chambers in said compartments having an opening therein for communication of said second chambers with at least one source of fluid pressure, each of said first chambers having another opening therein for communication of said first chambers respectively with another and metered source of fluid pressure.

7. A fluid selector comprising a casing having a pair of compartments therein, movable walls respectively dividing each of said compartments into two chambers, a first one of said chambers in each of said compartments having a discharge opening therein, the sealing of said discharge openings being respectively controlled by the position of said movable walls with respect thereto, each of the second of said chambers in said compartments having an opening therein for communication of said second chambers with at least one source of fluid pressure, each of said first chambers being in communication with another source of fluid pressure.

8. A low pressure fluid selector comprising a casing having a pair of compartments therein, flexible diaphragms respectively dividing each of said compartments into two chambers, a first one of said chambers in each of said compartments having a discharge opening and another opening therein, said diaphragms being respectively engageable with and adapted to seal said discharge openings, said selector having an output passage in direct communication with said other openings, a supply source of fluid pressure in direct communication with said first chambers, a source of fluid pressure greater in magnitude than said supply pressure in communication with the second of said chambers in one of said compartments and causing the diaphragm therein to be subjected to differential pressure on opposite sides thereof, a source of fluid pressure less than said supply pressure in communication with the second of said chambers in the other of said compartments, the diaphragm in said one compartment being responsive to said differential pressure in the chambers thereof to engage and seal off said discharge opening in said first chamber thereof and said diaphragm in said other compartment being responsive to the fluid pressure in the chambers thereof to throttle the discharge through said discharge opening in said first chamber thereof and permit the flow of fluid through said opening therein to said output passage at a pressure equal to the pressure of said source of fluid in communication with the second of said chambers in said other compartment.

9. A fluid pressure responsive device comprising an enclosing casing defining a pair of compartments in said device, flexible diaphragms respectively dividing each of said compartments into a pair of chambers, a first one of said chambers in each of said compartments having a sealable discharge port therein, said first chambers being interconnected by a passage in communication with an output passage from said device, a pair of valves respectively positioned in said first chambers and interconnected by a rigid member extending through said chamber interconnecting passage, said valves being respectively engaged by and interposed between said diaphragms, a source of fluid pressure in communication with said first chamber in one of said compartments and with the second of said chambers in the other of said compartments and another source of fluid pressure in communication with the second of said chambers in said one compartment and with said first chamber in said other compartment, said diaphragms being responsive to a differential pressure between said sources of fluid pressure to move one of said valves positioned in said first chamber of one of said compartments in communication with the lower of said sources of fluid pressure into sealing engagement with said discharge port therein and permit the transmission of fluid from the higher of said sources of fluid pressure through said discharge port in said first chamber of the other of said compartments to said output passage.

References Cited in the file of this patent
UNITED STATES PATENTS

| | | |
|---|---|---|
| 1,363,878 | Johanson | Dec. 28, 1920 |
| 1,780,589 | Hendrix | Nov. 4, 1930 |
| 1,842,825 | Cunningham | June 26, 1932 |
| 2,669,249 | Whittman | Feb. 16, 1954 |